(12) United States Patent
Okamoto et al.

(10) Patent No.: US 8,732,604 B2
(45) Date of Patent: May 20, 2014

(54) INTERACTIVE TEST DEVICE AND A METHOD OF TESTING OF A CABLE NETWORK

(75) Inventors: Koji Okamoto, Indianapolis, IN (US); Ben Maxson, Beech Grove, IN (US)

(73) Assignee: JDS Uniphase Corporation, Milpitas, CA (US)

( * ) Notice: Subject to any disclaimer, the term of this patent is extended or adjusted under 35 U.S.C. 154(b) by 573 days.

(21) Appl. No.: 12/816,987

(22) Filed: Jun. 16, 2010

(65) Prior Publication Data

US 2011/0314344 A1  Dec. 22, 2011

(51) Int. Cl.
*G06F 3/0481*  (2013.01)

(52) U.S. Cl.
USPC ............ 715/772; 715/764; 715/767; 715/771

(58) Field of Classification Search
USPC .......... 370/241–253; 379/10.01–35; 715/764, 715/767, 771, 772
See application file for complete search history.

(56) References Cited

U.S. PATENT DOCUMENTS

| 5,533,093 | A | 7/1996 | Horton et al. ................... 379/21 |
| 2005/0135259 | A1* | 6/2005 | Yazdi et al. ................... 370/241 |
| 2007/0013362 | A1* | 1/2007 | Loh et al. ................... 324/158.1 |
| 2008/0043927 | A1* | 2/2008 | Lysaght et al. ................. 379/21 |
| 2009/0089688 | A1 | 4/2009 | Zhao ............................. 715/762 |
| 2009/0164923 | A1 | 6/2009 | Ovi .............................. 715/764 |
| 2009/0171483 | A1* | 7/2009 | Scheuermann ................. 700/83 |

* cited by examiner

*Primary Examiner* — Amy Ng
*Assistant Examiner* — Claudia Dragoescu
(74) *Attorney, Agent, or Firm* — Matthew A. Pequignot; Pequignot + Myers LLC (57) ABSTRACT

A test device is disclosed having a display and a graphical user interface (GUI) that provides guidance to a user by displaying first and second icons for representing first and second actions to be taken by the test device upon selecting the first and the second icons, respectively, by the user. To provide the guidance to the user, the second icon has graphical features indicative of the current status of the first action. For cases where the first action is a test that failed, the second action is highlighted thereby guiding the user to take the second action in response to the failed test. At least one of the graphical features of the second icon is indicative of whether the second icon is currently selectable by the user.

17 Claims, 8 Drawing Sheets

INTERACTIVE TEST DEVICE AND A METHOD OF TESTING OF A CABLE NETWORK

TECHNICAL FIELD

The present invention relates to test devices, and in particular to cable network test devices having interactive features for assisting a user in selecting tests to be run to solve a problem in the cable network.

BACKGROUND OF THE INVENTION

Test equipment, and in particular cable network test equipment, frequently requires a user to choose between functionally distinct tests. The tests are selected in dependence upon a problem being investigated. Typically, the tests are selected from a list-type menu structure, an icon-based menu structure, or a combination of the two menu structures. The user must be able to know which tests and test modes to employ in each particular case. Multiple tests are often required to investigate most problems, such as a poor quality of digital reception, for example. To assist the user, shortcuts can be provided in a graphical user interface of the test equipment. The shortcuts take the user directly from one mode to another without having to return to the main menu.

Figure 1:
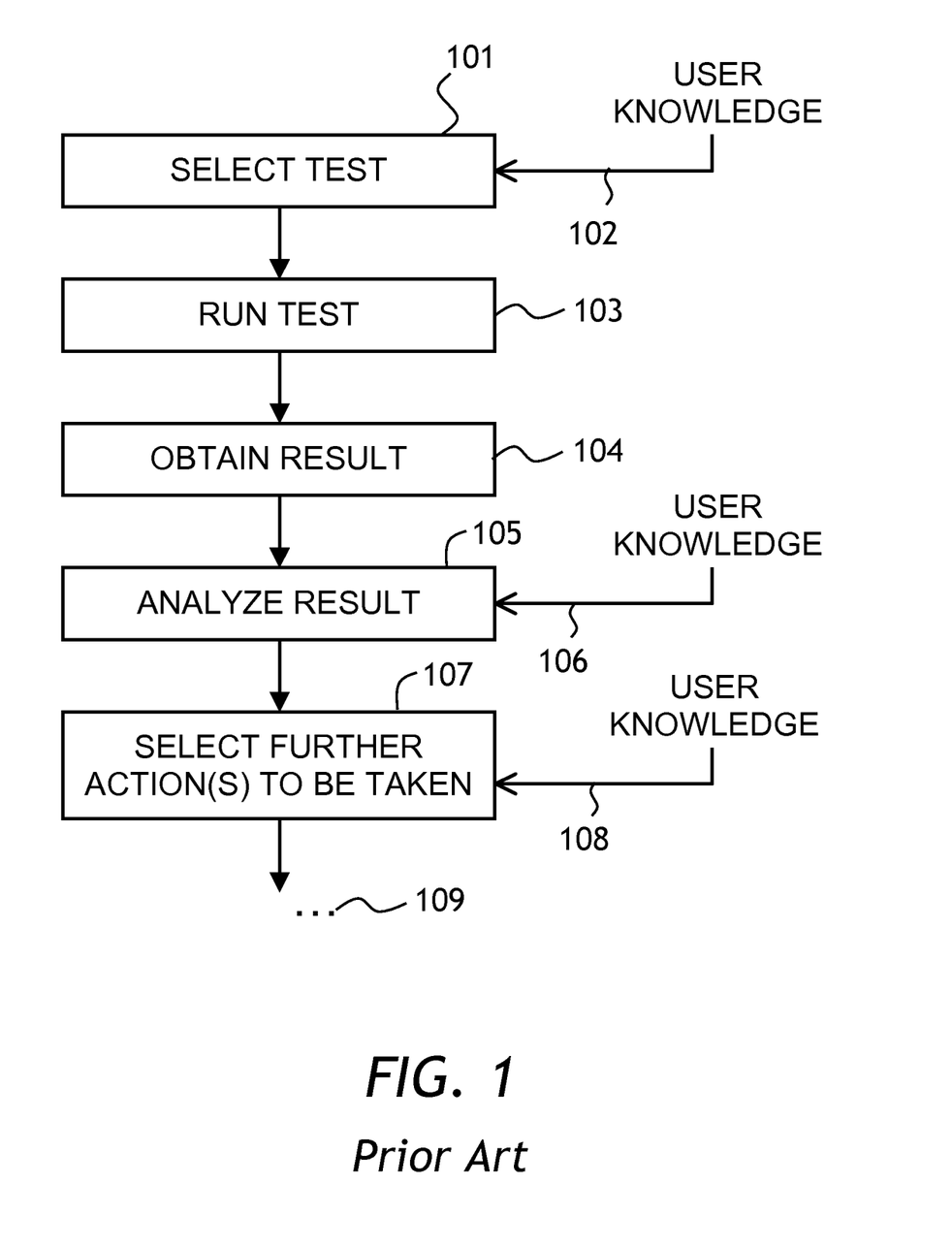
FIG. 1 is a flow chart of a prior-art testing method of finding a root cause of a network problem.

Referring to FIG. 1, a flow chart of a prior-art method of investigating a network problem is shown. At a step 101, a user, such as a field test technician, selects a test to be run. The test is selected based on the technician's knowledge of which tests need to be run to investigate a particular problem, as shown schematically with an arrow 102. At a step 103, the tests are run by the test device. At a step 104, the test results are obtained, typically in form of a table or a graph on a display unit of the test device. At a step 105, the results are analyzed by the technician to find a root cause of the problem. This step also requires a specific knowledge by the technician, as is shown by an arrow 106. At a step 107, the technician selects further action or actions to be taken to further investigate the problem, and the process continues as illustrated with dots 109 until the root cause of the problem is found. The step 107 of selecting further actions to be taken also requires knowledge 108 by the technician of all tests available to the test device and the appropriate circumstances under which the tests are to be run.

One drawback with the traditional approach illustrated in FIG. 1 is that it requires the field service technicians using the test equipment to know in detail the circumstances under which each test is to be run. Considering a large number of tests that can be run to troubleshoot a particular problem, and considering a significant extent of problems that might occur, this requirement is difficult to meet in practice. Furthermore, new equipment is being developed and added to a typical cable network to expand services delivered to clients. New equipment and associated new services can only be deployed if an equipment update is adequately supported by a growing testing and troubleshooting capability, which requires new tests to be added on ongoing basis. Maintaining an adequate up-to-date training of the technical personnel in such rapidly growing environment represents a formidable challenge.

One known solution to simplify the testing procedure is to program the test equipment to run predetermined successions of tests using a scripted succession of test commands. In this mode, which is sometimes called "autotest" mode, the testing equipment consecutively runs all the measurements listed in the script, typically on multiple information channels. At the end of the measurements cycle, the test equipment generates a table showing test results. For example, channel power readings can be displayed, for all channels present, so that the user can check whether channels of interest have sufficient power to be reliably detected. Many other tests, such as modulation error ratio (MER), bit error ratio (BER), carrier-to-noise ratio (CNR), quadrature amplitude modulation (QAM) ingress, etc., are also performed on channel-by-channel basis.

While scripted "autotest" measurements provide an advantage of standardized testing done by field service technicians, allowing comprehensive and standardized data logging, the sheer amount of information presented to the technician at the end of the "autotest" represents a difficulty to the technician, whose task is to quickly determine the root cause of the problem. To be able to understand and navigate in vast amounts of data generated by the "autotest", the technician must not only understand the basics of network operation, but also be familiar with data processing and have strong analytical skills. Therefore, introduction of "autotest" does not reduce the amount of training required. In essence, it simply expands the required training into another area.

The prior art is lacking a solution that would allow a user to quickly analyze a particular problem without requiring ongoing, extensive, and time-consuming on-the-job training. Accordingly, it is a goal of the present invention to provide a solution that reduces the amount of training required, while streamlining and standardizing the testing process.

SUMMARY OF THE INVENTION

A test device of the invention is constructed and programmed to guide the user in finding the root cause of the problem. The guidance is achieved by providing a novel graphical interface for the user.

In accordance with the invention there is provided a test device for testing a cable network, comprising:
an input port, for connecting to the cable network;
a testing apparatus coupled to the input port, for performing tests of the cable network;
a display;
a central processing unit (CPU) for controlling the testing apparatus and the display; and
a graphical user interface (GUI) for inputting user commands to the CPU and for conveying results of the tests by displaying them on the display;
wherein the GUI comprises a set of icons including first and second icons,
wherein the first icon is for representing a network problem category, wherein the first icon has a graphical feature corresponding to the network problem category, wherein the CPU is suitably programmed to cause the testing apparatus to perform a first test of the cable network automatically or upon selecting the first icon by a user of the test device;
wherein the second icon is for representing a second test of the cable network, wherein the second icon has a graphical feature corresponding to the second test, wherein the CPU is suitably programmed to cause the testing apparatus to perform the second test of the cable network upon selecting the second icon by the user;
wherein the second icon has a guiding feature indicative of a current status of the first test, for guiding the user whether to select the second icon to cause the test device to perform the second test, in dependence upon the current status of the first test.

The current status of the first test can represent a result of the first test. Depending on the result, the test device highlights an icon representing a next recommended step. In this way, the graphical features representative of the current status of tests currently in progress can function as a guide for the user in selecting a further test for the test device to perform. When the next test is selected and executed, its result will determine which icons are to be highlighted or brought up on the next display screen, and so on.

In accordance with yet another aspect of the invention, the graphical interface further includes "problem category icons" for selecting a particular problem category by the user of the test device. When the user selects a particular problem category, at least one of the test actions are run automatically in the background; further guidance to the user is provided in graphical form, depending on the results of these automatically run tests.

In accordance with the invention there is further provided a method of finding a root cause of a problem in a cable network, comprising:
(a) providing a test device having an input port, a testing apparatus coupled to the input port, a display, a central processing unit (CPU), and a graphical user interface (GUI) for inputting user commands and for conveying results of the tests by displaying them on the display;
(b) connecting the input port of the test device to the cable network;
(c) automatically selecting, via the CPU, a first test to be run by the testing apparatus;
(d) performing the first test selected in step (c) to obtain a result of the first test; and
(e) using the GUI to display the result of the first test, obtained in step (d), in the form of a graphical feature of an icon representing a next action to be taken to find the root cause of the problem,
(f) whereby the user of the test apparatus is guided to take the next action by selecting the icon representing the next action.

The next action can include selecting a test mode for the next test to be run, displaying detailed results of the first test, or running additional tests. The first test can be user-selected using an icon corresponding to a general problem category, for example a problem category defined in a so called "trouble ticket".

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 2:
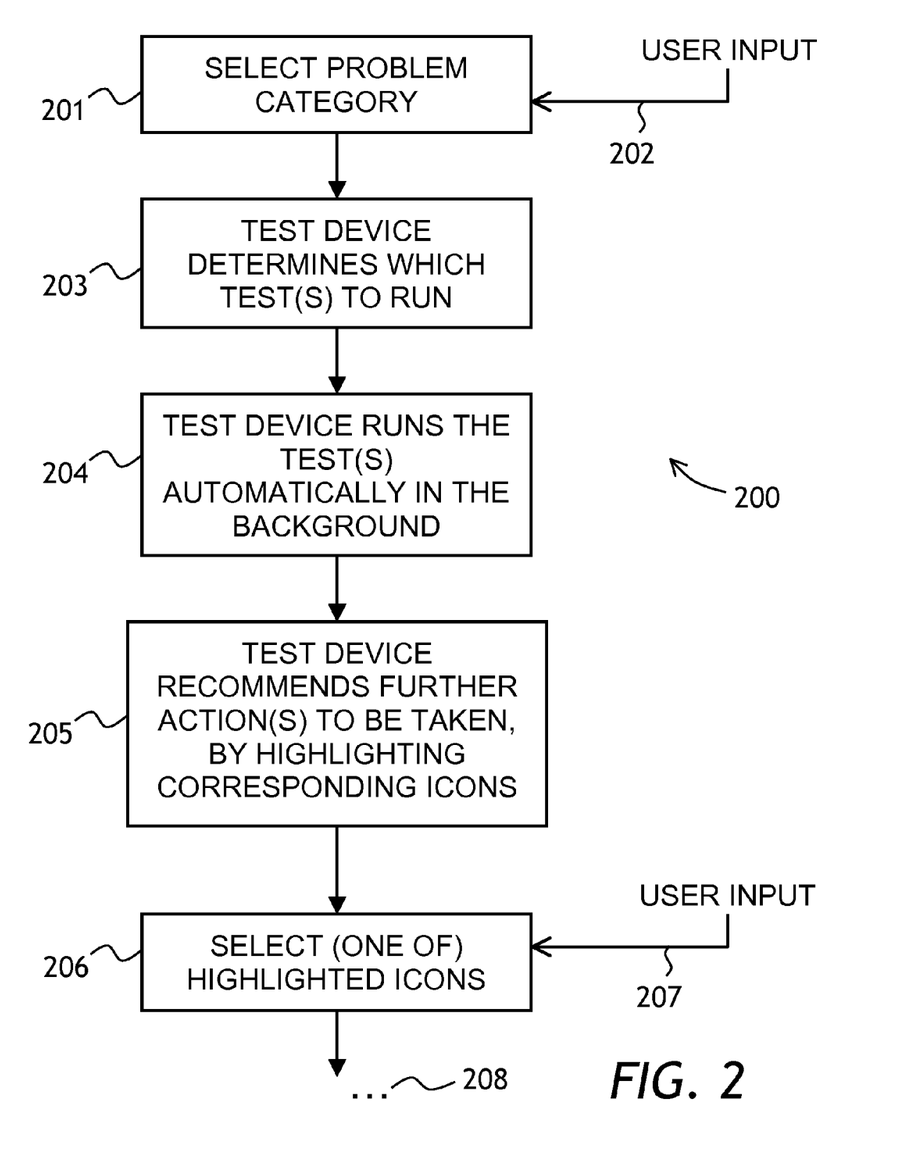
FIG. 2 is a flow chart of a method of testing according to the present invention.

Referring to FIG. 2, a flow chart of a test method 200 according to the invention is shown. At a step 201, a user of the testing device selects a problem category of a problem to be solved, for example "unstable digital reception" or "no signal on channel N", or the like. This step requires user input shown at 202. The user selects the problem category according to a problem description by the customer. The problem description is usually specified in a "trouble ticket". Upon receiving the user input 202, at a step 203, the test device automatically determines which tests must be run to increase the likelihood of solving a problem of the problem category selected at the step 201.

The step 201 of selecting the problem category by the user is optional. The test device can be programmed to automatically determine which tests to run upon connecting to the network being tested. In this case, the user input 202 would not be required, and the step 203 of determining which tests to run can be completely automatic.

At a step 204, the test device runs the tests automatically, preferably in the background, allowing the user to continue working with the test device. At a step 205, the test device analyzes the test results, characterizing each category of test results as nominal or anomalous. The test device can indicate the anomalous categories of test results by highlighting their corresponding icon or icons on the display of the test device. Thus, the bulk of data representing the first test results is normally hidden from the user, although the data remains accessible by the user by selecting an appropriate icon, if so desired. The test device then determines which tests must be run next to find the root cause of the problem, or to increase the likelihood of finding the root cause. The test device recommends further actions to be taken, for example further tests to be run, by highlighting corresponding icon or icons on the display of the test device. The user is not required to analyze the data and draw conclusions, because at the step 205, the further actions are determined automatically by the test device and are recommended for the user to take, by highlighting corresponding icons, the selection of which will result in the test device taking these actions. At a step 206, the user selects at least one of highlighted icons. The step 206 requires a user input 207. The process continues at 208, wherein after taking the actions selected at 206, the user is guided to take further actions depending on the result of the actions taken at 206, and so on, until the root cause of the problem is found.

The test method 200 considerably simplifies requirements for training of field service technicians, while streamlining and standardizing the testing procedure. The CPU of the test device must be suitably programmed to be able to determine which test(s) to run at the step 203 and which actions to take next at the step 205. Many test devices can use the same program for performing the steps 203 and 205. As a result, the test procedure is standardized, without requiring re-training of all technicians whenever a new test is introduced.

The icons representing a next step to be taken can be highlighted using any suitable graphical feature, for example bold lines, green or red color of the icons, and the like. Some graphical features of the icons can represent whether the icon and a corresponding action is presently available to the user. Furthermore, the icons representing the tests that are too early to take because the results of previous tests are not yet available, can remain entirely hidden, appearing only when it is appropriate to take corresponding actions. Alternatively or in addition, the icons representing further tests can be disposed in a recommended order of execution of these further tests.

Figure 3:
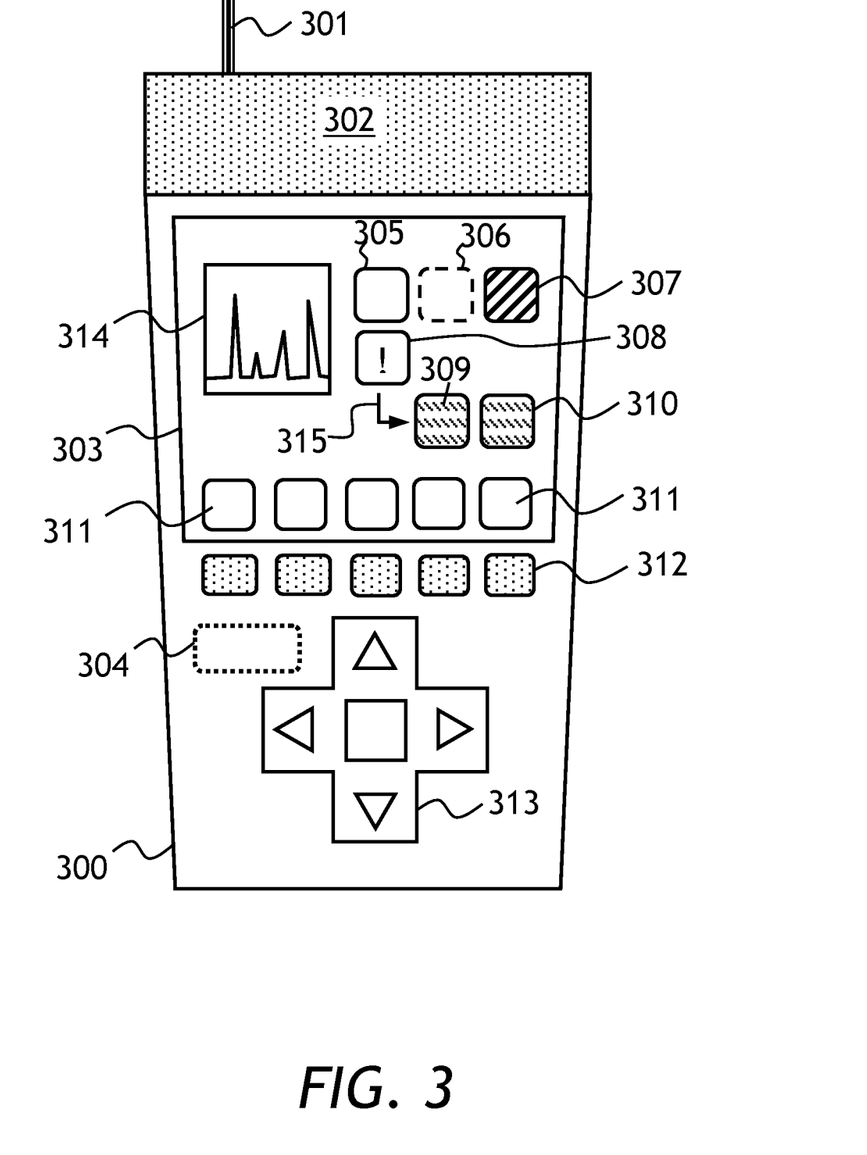
FIG. 3 is a frontal schematic view of a test device of the present invention.

Referring now to FIG. 3, a test device 300 according to the present invention is shown. The test device 300 is preferably a handheld device. The test device 300 has an input port 301, for connecting to equipment to be tested, such as a cable network; a testing apparatus 302 coupled to the input port 301, for performing tests of the cable network; a display 303; and a central processing unit (CPU) 304 for controlling the testing apparatus 302 and the display 303. The test device 300 also has a graphical user interface (GUI) between the test device 300 and the user of the test device 300, for inputting user commands and for conveying results of the tests by displaying them on the display 303, for example in form of a graph 314. The GUI has a set of icons 305-311 for representing actions to be taken by the test device 300 upon selecting the icons 305-311 by the user. Of the icons 305-311, some icons have graphical features indicative of a status of tests associated with some other icons. For example, the icon 309 has graphical features indicative of a status of a test associated with the icon 308. When the test run by selecting the icon 308 has a result that indicates that an action represented by the icon 309 must be taken next to find root cause of the problem, the icon 309 is highlighted, so the user is guided to take the next action by selecting the icon 309, in accordance with the method 200 described above.

The status of the test associated with the icon 308 can be representative of whether the test has been completed by the test device 300. The status of the test can represent a result of that test, for example whether the test has failed, so that, for example, if the test associated with the icon 308 has failed, the next icon 309 is highlighted. Some of the graphical features of the icons 305-311 can represent the status of the tests represented by the same icons. For example, while the test is running, a corresponding icon can be grayed out indicating that it cannot be selected again until the test is completed. When the test is completed, the corresponding icon appearance can have a bearing on a result of the test, for example whether the test has passed or failed. For example, if the test represented by the icon 308 has failed, an exclamation sign may be placed on that icon, as shown in FIG. 3.

Some of the icons 305-311, for example the icons 305-307, have graphical features that are indicative of a problem category of a problem with the cable network. The user would normally select one of the icons 305-307 that represents a problem outlined in the trouble ticket, thus performing the step 201 of the method 200 discussed above. A test corresponding to the problem category selected by the user is run automatically, preferably in the background, upon selecting one of the icons 305-307. The CPU 304 is suitably programmed to select the test or tests to be run depending upon the likelihood of solving the problem of the problem category highlighted by the user. In general, wherein a first icon represents a first action to be taken and a second icon represents a second action, the graphical features of the second icon function as a guide for the user to assist the user in deciding whether to select the second icon to cause the test device to take the second action, for example to run a second test, or to display a detailed table of results of previous test highlighting problem areas. When the second test has been completed, its results will have a bearing on which icon is to be selected next, to run a third test, and so on; in this way, the user is guided to finding a root cause of the network problem.

A subset of the icons 305-311, for example the third-row icons 309 and 310, can represent tests to be performed in one of a plurality of test modes of the testing apparatus 300. At least one graphical feature of the third-row icons 309 and 310 functions as a guide for the user in selecting a particular test mode to be used for a next test to be performed by the testing apparatus 300. Alternatively or in addition, the third-row icons 309 and 310 can represent high-priority and low-priority actions, respectively, so that an icon corresponding to the low-priority action, for example the icon 310, is not selectable until the high-priority action is completed. The priority status of the third-row icons 309 and 310 can be managed from the head end of the cable network and is communicated to the test device through the cable network, or the CPU 304 can be suitably programmed to prioritize the third-row icons 309 and 310. The icons are prioritized by a graphical feature thereof and/or by a relative position of the icons on the display 303 of the test device 300. In one embodiment of the invention, the icons are prioritized in dependence upon a result of the action taken upon selecting the icon 308 by the user, as is symbolically indicated with an arrow 315.

Some of the icons, for example the fourth-row icons 311, can be disposed along an edge of the display 303 and are selectable by corresponding "soft keys" 312 disposed on the test device 300 proximate to the edge of the display 303. Alternatively, the icons 305-311 can be selectable by using Left-Up-Right-Down buttons 313 of the test device 300.

The test device 300 can have an optional storage device, not shown, so that the test results can be stored on the storage device for subsequent analysis. Alternatively or in addition, the test results can be communicated to another test device or to a central office or the head end of the cable network being tested.

Figure 4:
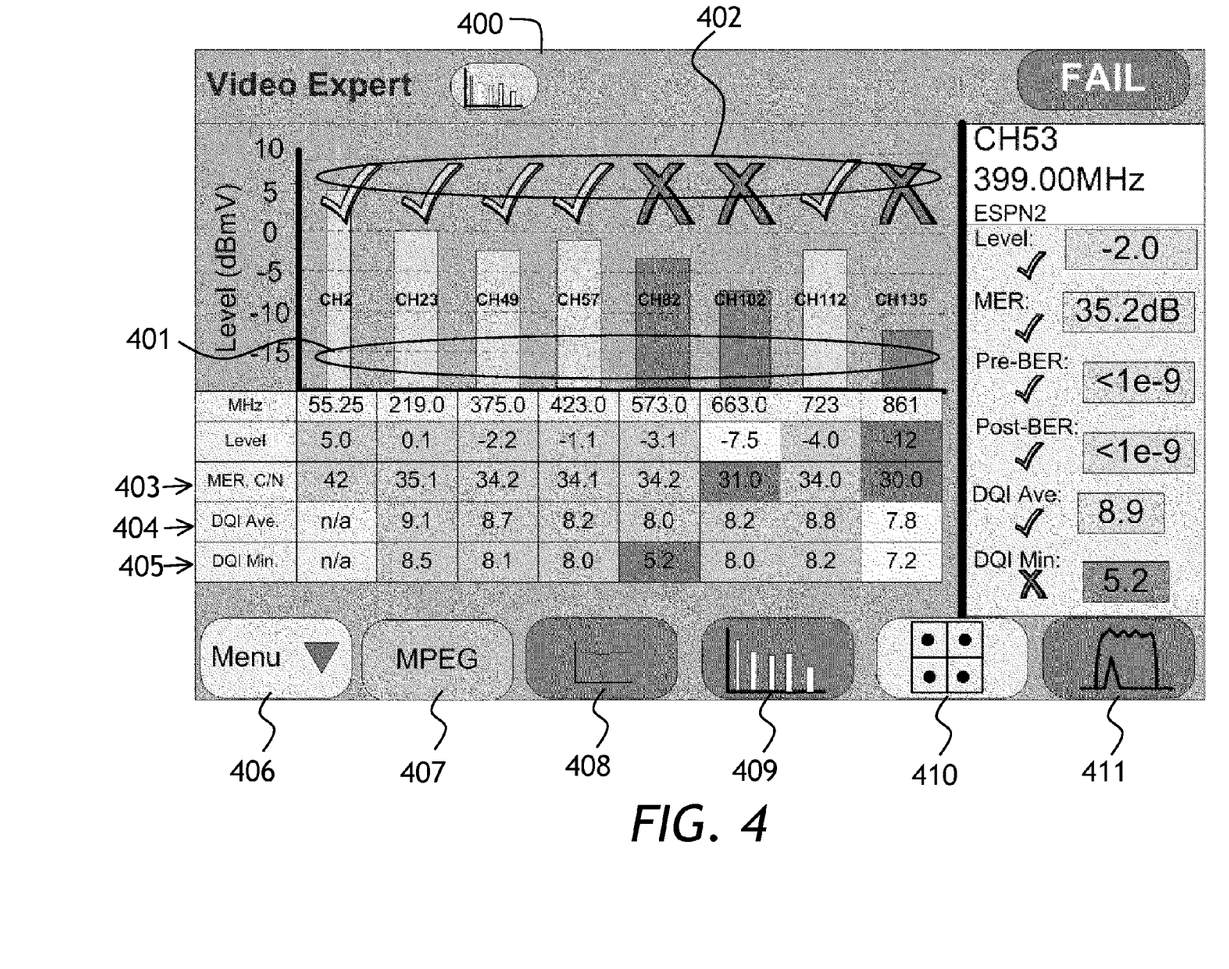
FIG. 4 is an example graphical interface of the invention showing results of channel power measurements.

Turning now to FIG. 4, an example screen 400 of the GUI of the invention is presented. The screen 400 shows results of channel power measurements on multiple channels. To measure signal power of multiple channels, the CPU 304 causes the test apparatus 302 to tune to these channels one by one and to measure the power of the signal, channel by channel, storing the individual channel power readings in memory. The screen 400 shows results of channel power measurements 401 for multiple channels, indicating pass-fail status of individual channels at 402. The screen 400 also shows results of modulation error ratio (MER) of individual channels at 403, as well as average and minimal digital quality index (DQI) of individual channels at 404 and 405, respectively.

Icons 406-411 are of a particular interest. Selecting the icon 406 causes the main menu to be displayed; selecting the button 407 causes a MPEG stream analysis results to be displayed and further MPEG tests to be performed; selecting the button 408 causes channel DQI measurement detailed results to be displayed and further DQI measurements to be performed; selecting the button 409 causes the channel power measurement detailed results to be displayed and further DQI measurements to be performed; selecting the button 410 causes the constellation measurements detailed results to be displayed and further constellation measurements to be performed; and selecting the button 411 causes detailed QAM ingress results to be displayed and further QAM ingress measurements to be performed. The icon 410 is highlighted, while icons 407 to 409 and 411 remain dark and disabled because, based on the result of previous measurements, the constellation measurement is the next step that must be taken to troubleshoot the problem at hand. The icons 406-411 can be grayscale or color coded.

Figure 5:
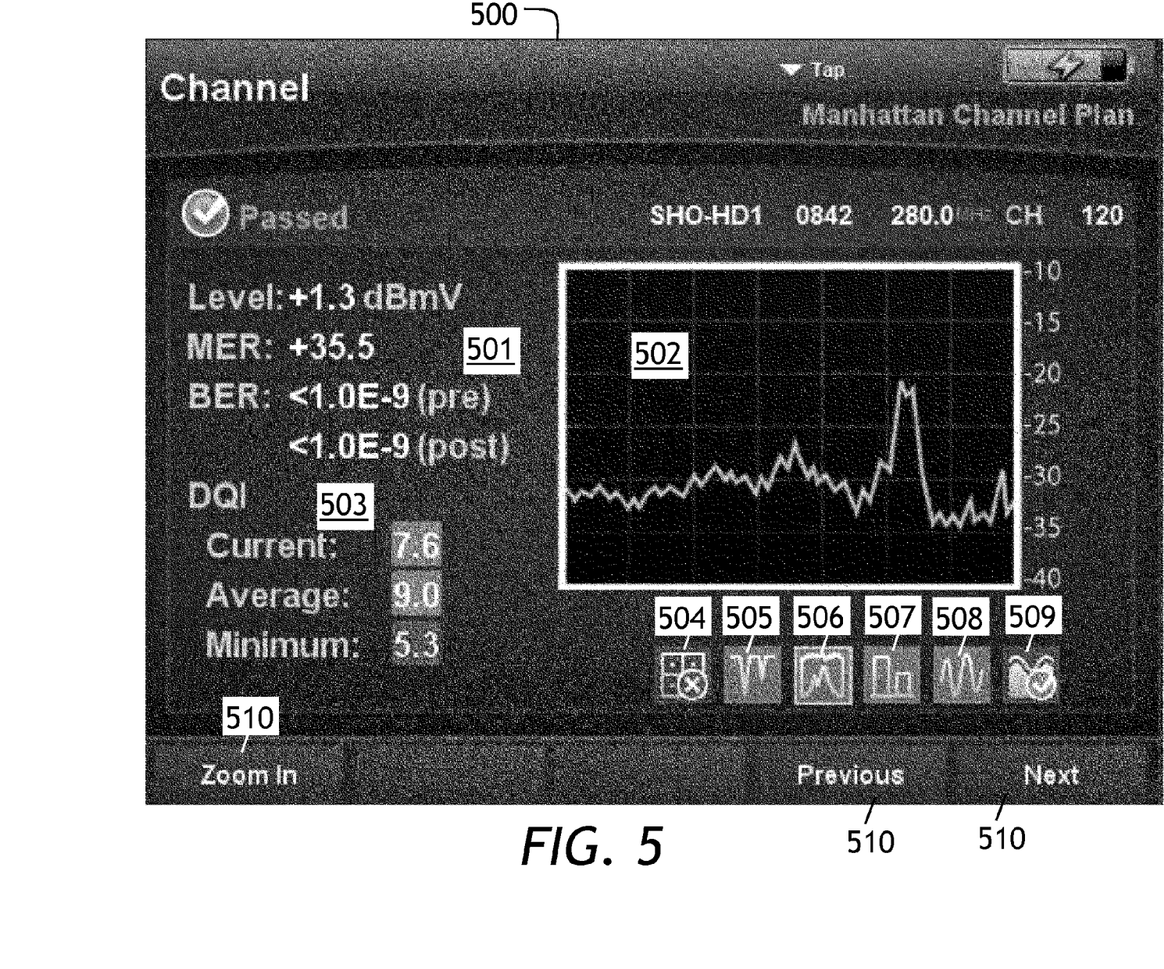
FIG. 5 is an example graphical interface of the invention showing selectable icons indicative of previous test results.

Referring now to FIG. 5, another example screen 500 of the GUI of the invention is shown. The screen 500 shows results of channel power level/MER/bit error ratio (BER) at 501, RF spectrum at 502, and DQI at 503. The screen 500 is displayed when the constellation measurement recommended on the screen 400 has been already performed and yielded a "failed"

result, along with a spectrum flatness measurement that has yielded a "passed" result. Of particular interest are icons 504 to 510 showing the measurements performed or available to be performed. The icons 504 and 509 indicate the failed constellation measurement result and the passed spectrum flatness test result, respectively. The icons 510 can be made selectable by the soft keys 312 of FIG. 3, for example.

Figure 6:
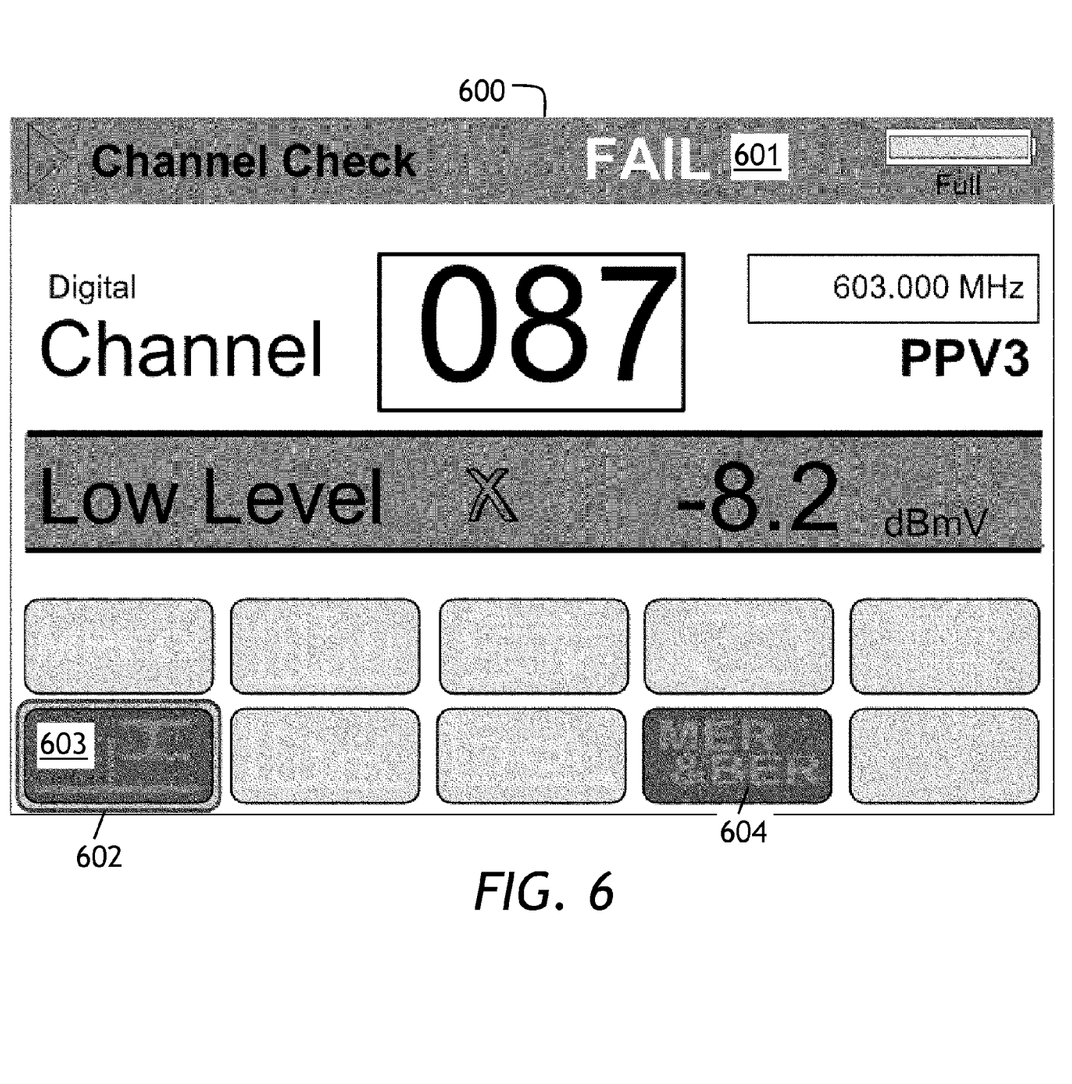
FIGS. 6 and 7 are example graphical interfaces of the invention showing icons guiding the user to a next recommended test.

Turning to FIG. 6, another example screen 600 of the GUI of the invention is shown. The screen 600 shows a result of channel-by-channel testing initiated by selecting an icon from a menu list or by other means. On the screen 600, the results of testing a digital channel #087 are presented. The test has yielded a "fail" result, as indicated at 601. The current measurement (channel signal power) is indicated by a border 602 drawn around an icon 603 representing the channel power measurement. In this example, the test device 300 also recommends MER and BER of this channel to be measured next, as indicated by a highlighted icon 604 representing MER and BER tests and by the rest of the icons remaining "grayed out".

Figure 7:
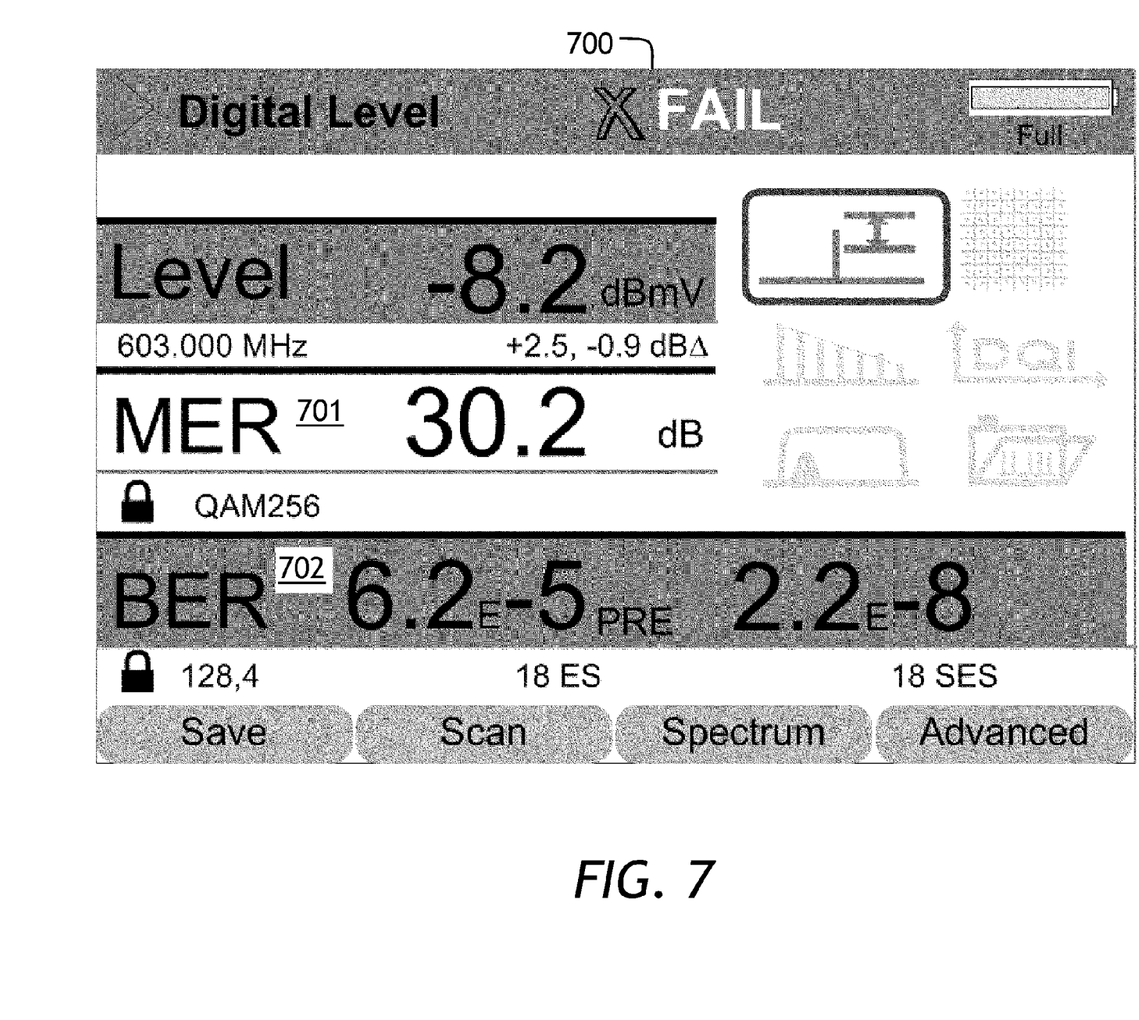

Turning to FIG. 7, another example screen 700 of the GUI of the invention is shown. Guided by a previous menu or icon, the test technician has selected a particular digital channel to test. The digital channel tests can include, for example, a MER test and a BER test. Upon completion of the MER and BER tests, the screen 700 appears on the display 303 of the test device 300. The MER and BER test results are displayed on the screen 700 at 701 and 702, respectively. Additional icons representing Level, Constellation, Tilt, DQI, QAM Ingress, and Channel plan are available for user selection and will be highlighted if background tests suggest they are anomalous. In this way, the technician is guided by the GUI of the test device 300 to run a succession of tests in dependence on intermediate results of the tests that have already been run, with the purpose of finding the root cause of the problem.

Figure 8:
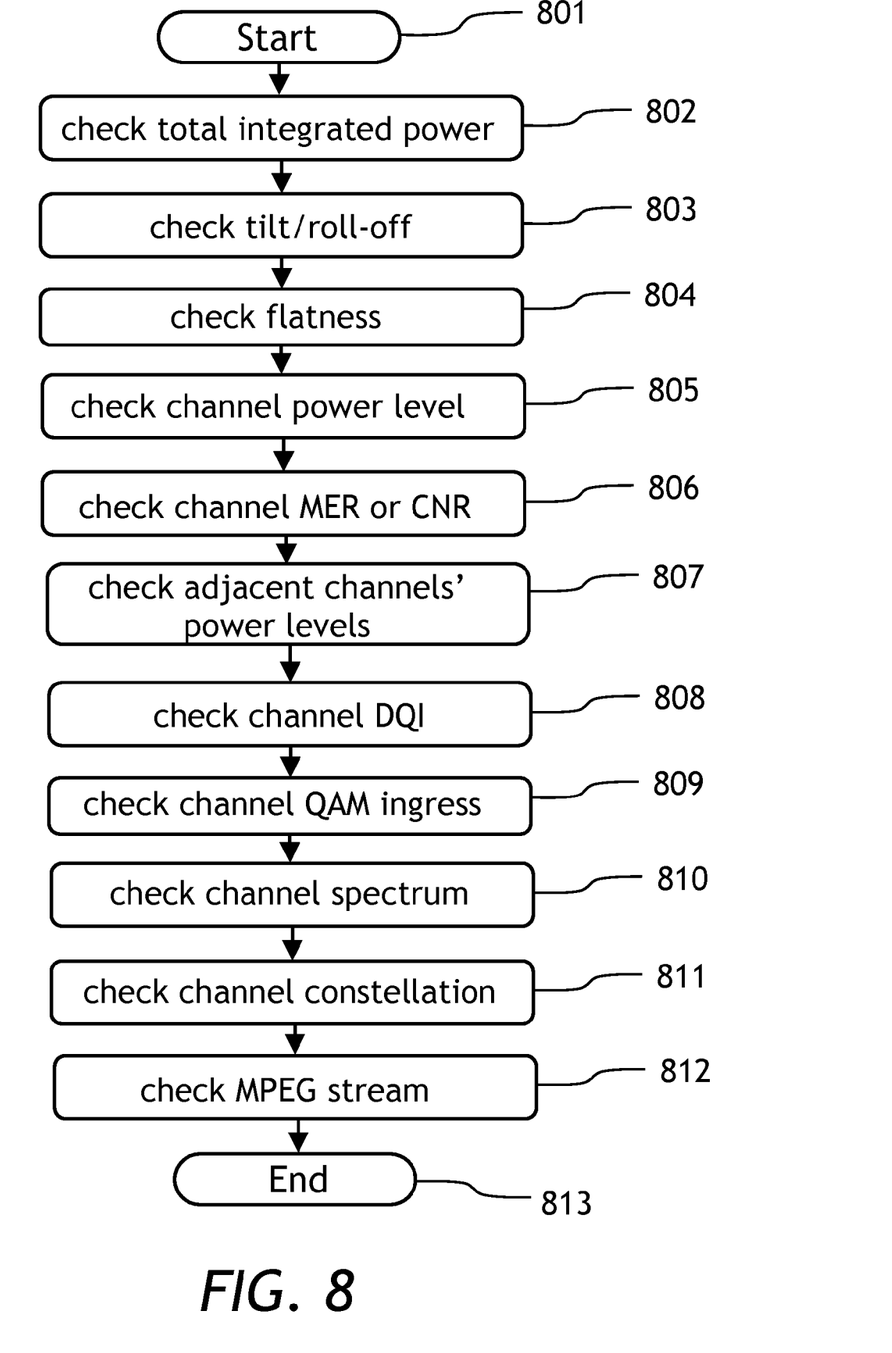
FIG. 8 is a flow chart showing a recommended order of tests for troubleshooting a digital channel reception problem.

Turning now to FIG. 8, a flow chart is presented showing typical measurements required for troubleshooting a digital channel reception problem in a cable network. The "digital channel reception" is one of many problem categories selectable by the user as described above by highlighting a corresponding icon. The troubleshooting process starts at 801. At a step 802, the total integrated power at a test location of the cable network is checked. At a step 803, spectrum tilt or roll-off is measured. At a step 804, the spectrum flatness is evaluated. At a step 805, the power level of the channel of interest is measured. At a step 806, the channel MER or carrier-to-noise ratio (CNR) is evaluated. At a step 807, signal power levels of adjacent channels are evaluated. At a step 808, the channel DQI is determined. At a step 809, the channel quadrature amplitude modulation (QAM) ingress noise is measured. At a step 810, the channel spectrum is measured. At a step 811, the channel QAM constellation is checked. At a step 812, the channel MPEG stream is checked. The process ends at 813. For the steps 802 to 812, the availability of test results, indication of results which are anomalous, and the next step to be taken are suggested to the test technician by highlighting corresponding icons, as described above, and by hiding or "graying out" the icons representing measurement steps that are nominal or that are too early to take. For example, until the channel power is evaluated at 805, it is too early to evaluate the MPEG stream at the step 812. Thus, the flow chart of FIG. 8 can be used as an example guide in programming the CPU 304 to perform corresponding tests and highlight corresponding icons for a next test to perform. The particulars of CPU programming depend on kind and topology of the cable network to be tested.

All the tests 802 to 812 can be run automatically in the background, in the order shown; as the test results become available, the icons of the GUI corresponding to the tests 802 to 812 become activated, so that the test results can be displayed. For example, these icons can be colored red or green, in dependence on the result of the corresponding test, or they can simply be redrawn from a gray color to some other color.

Many color arrangements are of course possible. The color coding of icons or other graphical features introduced into the icons are intended to indicate that the icon is available for selecting upon completion of the corresponding test, so that displaying the test results is now possible. Furthermore, these graphical features, when combined in a single icon, can represent various test information so far obtained.

Referring back to FIGS. 2 and 3, one general method of testing a cable network according to the present invention consists of the following steps:

(a) providing a test device, such as the test device 300 having the input port 301; the testing apparatus 302 coupled to the input port 301; the display 303; the central processing unit (CPU) 304; and the graphical user interface (GUI) for inputting user commands and for conveying the results of the tests, for example the graph 314, by displaying them on the display 303;

(b) connecting the input port 301 of the test device 300 to the cable network;

(c) using the GUI to allow a user of the test device 300 to select a problem category of the problem represented, for example, by the trouble ticket issued in response to a complaint by the customer of the cable network. As noted above, this step can in principle be omitted, in which case the CPU 304 would have to be programmed to run the same set of initial tests automatically. This step is exemplified by the step 201 of the method 200 of FIG. 2;

(d) automatically selecting, via the CPU 304, a first test to be run by a testing apparatus, depending upon the likelihood of solving a problem of the problem category selected by the user in step (c). This step is exemplified by the step 203 of the method 200;

(e) performing the first test selected in step (d) to obtain a result of the first test. This step is exemplified by the step 204 of the method 200; and (f) using the GUI to display the result of the first test, obtained in step (e), in form of a graphical feature of a summary icon representing whether the corresponding test results are anomalous or highlighting an icon representing a next action to be taken to find the root cause of the problem. This step is exemplified by the step 205 of the method 200.

By performing steps (b) to (f), the user of the test apparatus 300 is guided to view in detail the most anomalous test results and/or to take a next action by selecting the next icon, which becomes highlighted or activated. The next action can include selecting a test mode for a next test to be performed by the test device; for example, the user selects one of the highlighted icons at the step 206 of the method 200. The next action can also include displaying the data obtained in the graphical form, zooming on a particular area of the graph, performing statistical analysis, and so on.

Preferably, after step (e), a step (e1) is performed to cause the CPU 304 to automatically prioritize a plurality of further actions to be taken to find the root cause of the problem, in dependence upon the result of the first test obtained in step (e). Preferably, the GUI is used to display the result of the first test in form of a graphical feature of a plurality of icons representing the plurality of further actions, for example a color of the icon. The graphical feature is indicative of a high-priority action and a low-priority action of the plurality of further actions to be taken. Further, preferably, an icon representing the low-priority action will not be selectable until the high-priority action has been completed.

The test results can be stored on an optional storage device of the test device 300 or communicated to another test device or to a head end of the cable network. The centralized storage of the test results is particularly advantageous because it allows detailed analysis of the data collected by multiple test devices 300 at multiple locations of the cable network.

What is claimed is:

1. A test device for testing a cable network, comprising:
an input port, for connecting to the cable network; a testing apparatus coupled to the input port, for performing tests of the cable network; a display; a central processing unit (CPU) for controlling the testing apparatus and the display; and a graphical user interface (GUI) for inputting user commands to the CPU and for conveying results of the tests by displaying them on the display;
wherein the GUI comprises a set of user-selectable icons including first and second user-selectable icons,
wherein the first user-selectable icon is for representing a network problem category, wherein the first icon has a graphical feature corresponding to the network problem category, wherein the CPU is suitably programmed to cause the testing apparatus to perform a first test of the cable network upon selecting the first icon by a user of the test device;
wherein the second user-selectable icon is for representing a second test of the cable network, wherein the second icon has a graphical feature corresponding to the second test, wherein the CPU is suitably programmed to cause the testing apparatus to perform the second test of the cable network upon selecting the second icon by the user;
wherein the second user-selectable icon has a guiding feature indicative of a current status of the first test, for guiding the user whether to select the second icon to cause the test device to perform the second test, in dependence upon the current status of the first test; and
wherein a first subset of the set of icons is for representing high-priority and low-priority tests, wherein icons of the first subset of icons corresponding to the low-priority tests are not selectable until all the high-priority tests are completed, wherein the priority status of the first subset of icons is managed from a head end of the cable network and is communicated to the test device.

2. The test device of claim 1, wherein the current status of the first test is representative of whether the first test has been completed by the test device.

3. The test device of claim 1, wherein the current status of the first test is representative of a result of the first test.

4. The test device of claim 1, wherein the second icon has a graphical feature indicative of the current status of the second test.

5. The test device of claim 4, wherein the current status of the second test is representative of whether the second test has been completed by the test device.

6. The test device of claim 4, wherein the current status of the second test is representative of a result of the second test.

7. The device of claim 4, wherein the set of icons further includes a third icon for representing a third test of the cable network, wherein the third icon has a graphical feature corresponding to the third test;
wherein the CPU is suitably programmed to cause the testing apparatus to perform the third test of the cable network upon selecting the third icon by the user,
wherein the third icon has a guiding feature indicative of the current status of the second test, for guiding the user whether to select the third icon to cause the test device to perform the third test, in dependence upon the current status of the second test.

8. The test device of claim 1, wherein a second subset of the set of icons is for representing tests to be performed in one of a plurality of test modes of the testing apparatus, wherein at least one graphical feature of the second subset of icons is for functioning as a guide for the user in selecting a particular test mode to be used for a next test to be performed by the testing apparatus.

9. The test device of claim 1, wherein the icons of the first subset of icons are disposed in a recommended order of performing further tests.

10. The graphical interface of claim 1, wherein at least some of the set of icons are disposed along an edge of the display and are selectable by corresponding soft keys disposed on the test device proximate to the edge of the display.

11. The graphical interface of claim 1, wherein at least some of the set of icons are selectable by using Left-Up-Right-Down buttons of the test device.

12. The test device of claim 1, further comprising a storage device, wherein the CPU is suitably programmed to store the test results on the storage device.

13. The test device of claim 1, wherein the CPU is suitably programmed to communicate the test results to another test device.

14. A method for finding a root cause of a problem in a cable network, the method comprising:
(a) providing a test device having an input port, a testing apparatus coupled to the input port, a display, a central processing unit (CPU), and a graphical user interface (GUI) for inputting user commands and for conveying results of the tests by displaying them on the display;
(b) connecting the input port of the test device to the cable network;
(c) selecting a problem category icon corresponding to a problem category, and selecting, via the CPU, a first test to be run by the testing apparatus, based upon the selected problem category icon;
(d) performing the first test selected in step (c) to obtain a result of the first test; and
(e) using the GUI to display the result of the first test, obtained in step (d), in the form of a graphical feature of an icon representing a next action to be taken to find the root cause of the problem, whereby the user of the test apparatus is guided to take the next action by selecting the icon representing the next action;
wherein a first subset of the set of icons is for representing high-priority and low-priority tests, wherein icons of the first subset of icons corresponding to the low-priority tests are not selectable until all the high-priority tests are completed, wherein the priority status of the first subset of icons is managed from a head end of the cable network and is communicated to the test device.

15. The method of claim 14, wherein in step (e), the next action includes selecting a test mode for the next test to be performed by the test device.

16. The method of claim 14, further comprising a step of storing the result of the first test on a storage device of the test device.

17. The method of claim 14, further comprising a step of communicating the test results to another test device connected to the cable network.

* * * * *